(12) United States Patent
Miklosi et al.

(10) Patent No.: US 6,450,562 B1
(45) Date of Patent: Sep. 17, 2002

(54) PIVOT DRIVE FOR A FRONT SIDE ROOF ROD OF A MOTOR VEHICLE OR A CONVERTIBLE FOLDING TOP

(75) Inventors: Stefan Miklosi, München; Thomas Schütt, Fürstenfeldbruck, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/656,241

(22) Filed: Sep. 6, 2000

(30) Foreign Application Priority Data

Sep. 6, 1999 (DE) .......................... 199 42 429

(51) Int. Cl.[7] .................................. B60J 7/08
(52) U.S. Cl. ...................................... 296/115
(58) Field of Search ................... 296/115, 117, 296/119

(56) References Cited

U.S. PATENT DOCUMENTS

| 2,768,857 A | | 10/1956 | Albrecht |
| 4,671,559 A | * | 6/1987 | Kolb ............... 296/115 X |
| 5,769,483 A | | 6/1998 | Danzl et al. |

FOREIGN PATENT DOCUMENTS

| DE | 943 747 | 6/1956 |
| DE | 44 35 222 | 11/1995 |
| DE | 196 13 356 | 10/1997 |
| DE | 297 15 271 | 12/1998 |
| DE | 197 31 330 | 2/1999 |
| DE | 298 23 383 | 4/1999 |
| WO | WO 97/37866 | 10/1997 |

* cited by examiner

Primary Examiner—Joseph D. Pape
(74) Attorney, Agent, or Firm—Nixon Peabody LLP; David S. Safran

(57) ABSTRACT

A pivot drive for a front side roof rod of a motor vehicle roof or a convertible folding top which is supported with a pivoting joint on a rear lateral roof rod. The rear lateral roof rod is pivotally supported via a rod arrangement on the motor vehicle body. When the roof or folding top is open the top can be lowered into a lowered position, and when the roof or folding top is opened and closed the front side roof rod is pivoted by the pivot drive. The pivot drive has a connector that couples in driving engagement the front roof rod to a rod of the rod arrangement. The pivot drive pivots the front side roofrod relative to the rear roofrod when the roof or folding top is being lowered by the pivoting motion of the roof rod.

11 Claims, 20 Drawing Sheets

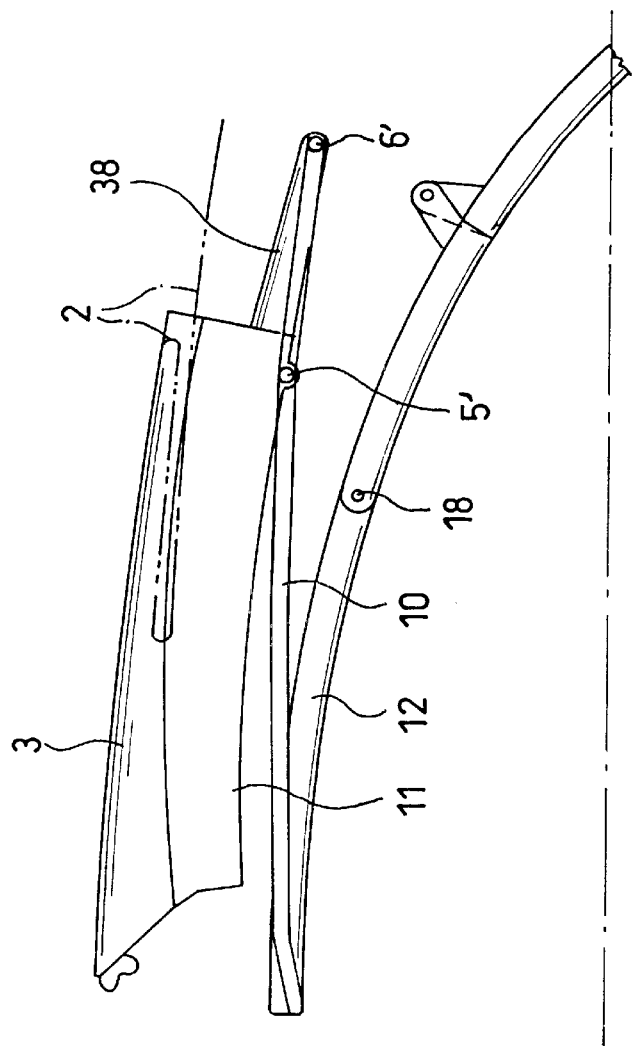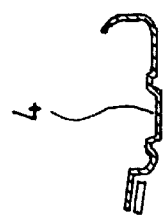
FIG. 11

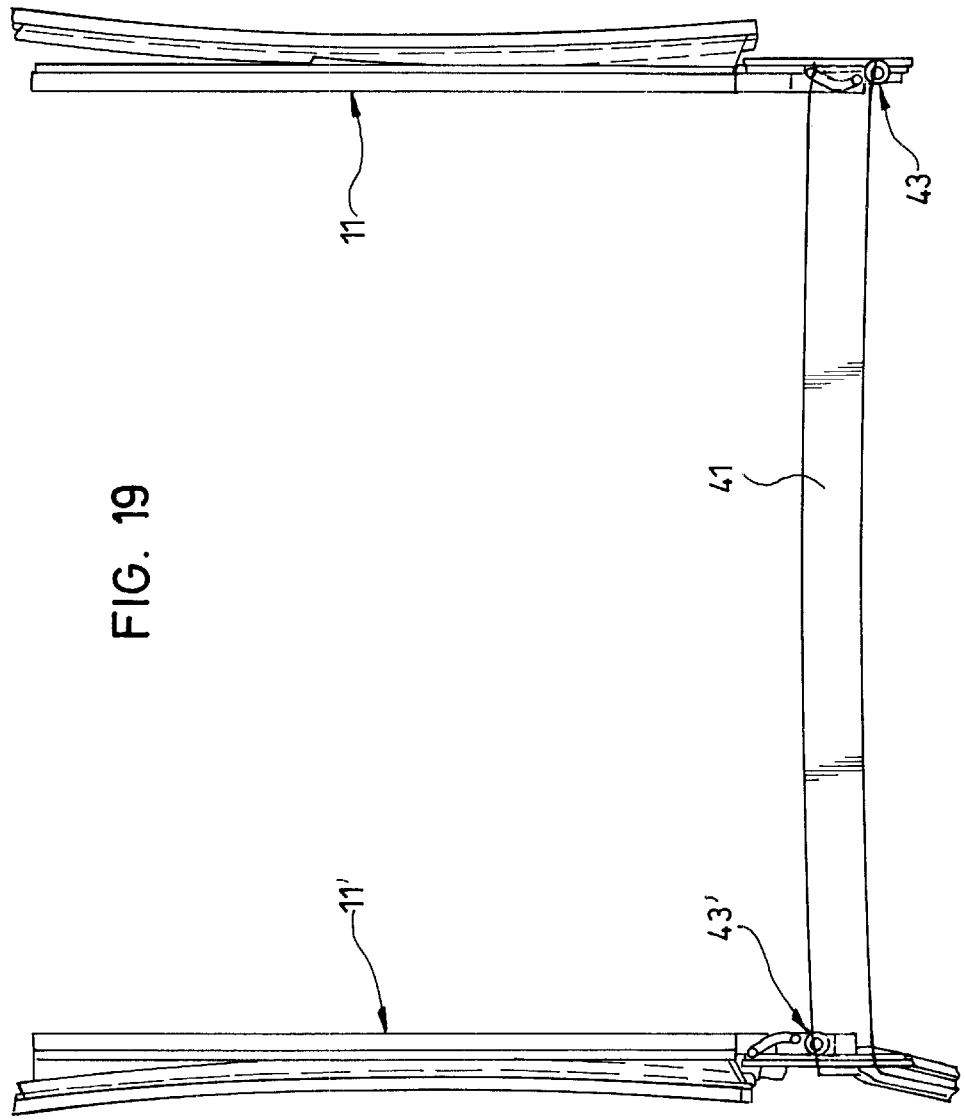

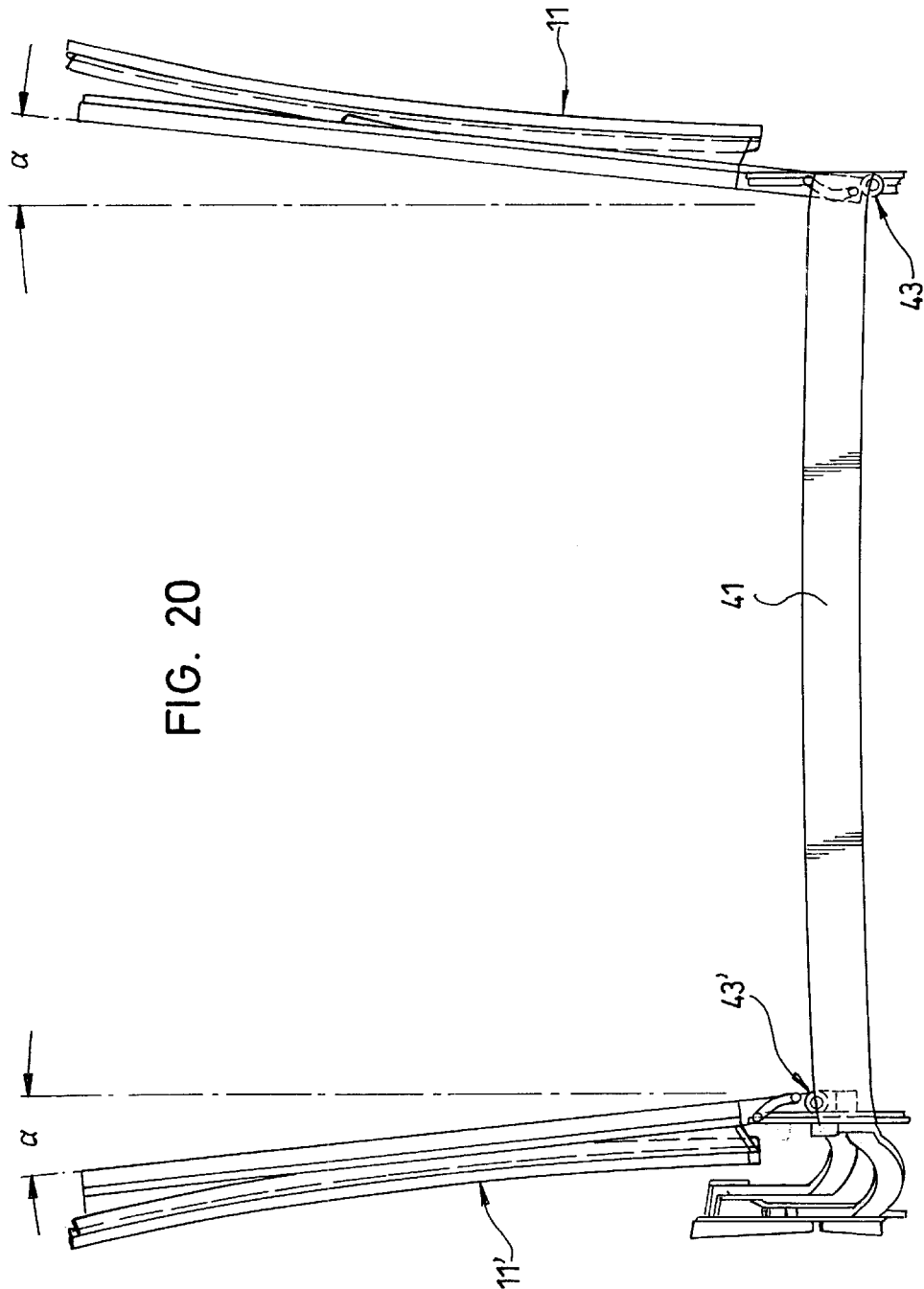

PIVOT DRIVE FOR A FRONT SIDE ROOF ROD OF A MOTOR VEHICLE OR A CONVERTIBLE FOLDING TOP

BACKGROUND OF THE INVENTION

1. Field of the Invention

The invention relates to a pivot drive for a front side roof rod of a motor vehicle roof or a convertible folding top which is supported with a pivot joint on a rear side roof rod which is pivotally mounted via a rod arrangement on the motor vehicle body. When the roof or folding top is open, it can be lowered. The roof or folding top is opened and closed by a pivot drive.

2. Description of Related Art

Pivoting of the front side roof rods via their own drive when the motor vehicle roof or the convertible folding top is being lowered is known. But control of the drive is necessary for timed swivelling-in of the roof rods.

Published International Patent Application WO 97/37866 discloses a kinematic folding top for a convertible. The top includes a front part of a three-member top frame that is moved out of the closed position by parallel pivoting into a lowered position via a parallelogram rod arrangement. The arrangement connects the side roof rods of the front part to those of the middle part. In the lowered position the front part of the folding top is identically cambered, i.e. with identically pointed arching, on the middle part of the cover. The motion of parallel pivoting of the first part of the folding top is forcibly coupled via a control lever to the lowering motion of the rear part of the folding top.

SUMMARY OF THE INVENTION

A primary object of the present invention is to provide a pivot drive which does not have any fault-susceptible control.

This object is achieved with a connector which engagingly couples the front roofrod to a rod arrangement which connects the motor vehicle body to a rear roof rod. The connector pivots relative to the rear roof rod when the roof or folding top is being lowered such that the pivoting motion of the rear roof rod pivots the front roof rod. This rod coupling or joint coupling results in mechanical coupling and transfer of motion which does not require either its own drive or an electronic control, but which proceeds in a restrained manner by the rod arrangement which lowers the roof or folding top into the lowered position. Instead of in a convertible with a fabric folding top, the pivot drive of the present invention can also be used in motor vehicle roofs with solid roof elements to clear a targa-like or convertible-like roof opening.

The pivot drive coordinates a pivoting motion of the front roof rods which takes place in a roughly horizontal plane of the motor vehicle such that the right and the left inwardly pivoting front roof rods do not mutually hinder one another.

The roof or folding top may be supported on the body by pivotally mounting the rear roof rods on the body with a parallelogram-like four-bar arrangement which contains a main column and a main connecting rod. An electrical or hydraulic main drive acts, for example, on the main column and moves the entire four-bar arrangement and, thus, the folding roof.

In one advantageous embodiment, the four-bar arrangement is coupled via a connector to the front roof rod. During the lowering of the folding top into the lowered position, the pivoting of the connector pivots the front rod.

To pivot horizontally in without problems, it is advantageous if the pivoting of the left and right front roof rods are staggered in time by the connector. In this way, the two pivoting roof rods can be pivoted into a transverse position, for example, on or underneath the main bow or the roof cassette from the left and right side of the folding top without mutual hindrance. The pivoting roof rods can, thus, have a greater length which corresponds, for example, roughly to the width of the folding top.

Feasibly, the connector provides a varying drive speed for the front roof rod. Thus, for example, the transmission of the motion of the connector can be designed such that the pivoting speed of the roof rod is adjusted depending on the pivoting speed of the main column and is variable over the pivoting path. Therefore, at the start and at the end of pivoting, a comparatively slow speed for lowering of the roof rods on the roof cassette and for coupling to the front cross member and in between a higher pivoting speed can be set.

Another embodiment calls for the connector to be driven by the pivoting main column of the four-bar arrangement, but also the main connector can be used as the drive.

Because the connector is coupled in driving engagement via a lock to the main column over a defined pivoting path, it is possible to fix the initial pivot position and the end pivot position of the main column to determine the area in which the connector pivots in an active driving connection when the folding top is being folded in or out.

Feasibly, the connector contains a transmission element which is pivotally mounted concentrically relative to the pivot bearing axis of the main column and next to the main column. The main column is a ring which is in a driving connection to the roof rod via a lever arm and via intermediate rods and joints of the connector.

In one simple embodiment, the lock contains a lock pin which is movably supported in the transmission element or ring, for example, axially, i.e., parallel to the bearing axis. The lock pin is pushed into coupling engagement with the main column depending on the pivoting position of the main column relative to the side part of the roof cassette.

For a reliable sequence of motions, the path of motion of the connector, especially of the lever arm of the ring, is limited by stops. In this way, the roof rods cannot be moved in an uncontrolled manner beyond their end positions.

For uniform and space-saving arrangement of the roof rods, which are pivoted in the transverse direction, it is advantageous if the pivot joints of the roof rods are offset against one another in the lengthwise direction of the motor vehicle. The amount of offset corresponding, for example, to roughly the thickness of the roof rods. The pivot joints have a vertical pivot axis and are arranged on the bilateral side parts of the roof cassette. Thus, also longer roof rods can be pivoted into the lowered position in a space-saving manner.

Preferably, the connector contains transmission gearing so that it is possible to match the input drive motion to the output drive motion. If, in doing so, the transmission gearing converts the input drive motion into a varying output drive motion of the front roof rod. Almost any necessary pivot drive motions for the roof rods can be carried out.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 10 to 13 are side horizontal projections of a third embodiment of a folding top in different positions from a closed position to completely open;

FIGS. 19 and 20 are top horizontal projections of two side roof rods which can be pivoted out.

DETAILED DESCRIPTION OF PREFERRED EMBODIMENTS

Figure 1:
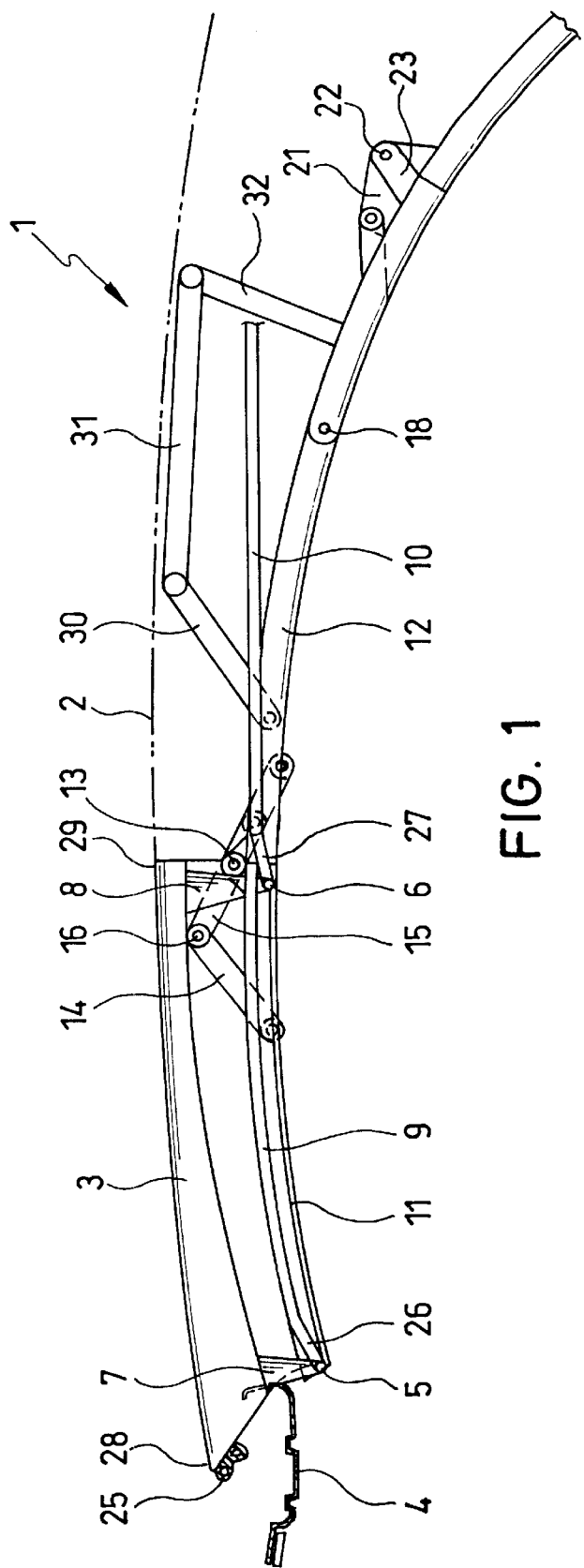
FIGS. 1 to 6 are side horizontal projections of a folding top of a convertible with side roof rods in different positions proceeding from a closed position (FIG. 1), through intermediate positions, to a fully open, storage position (FIG. 6)
Figure 2:
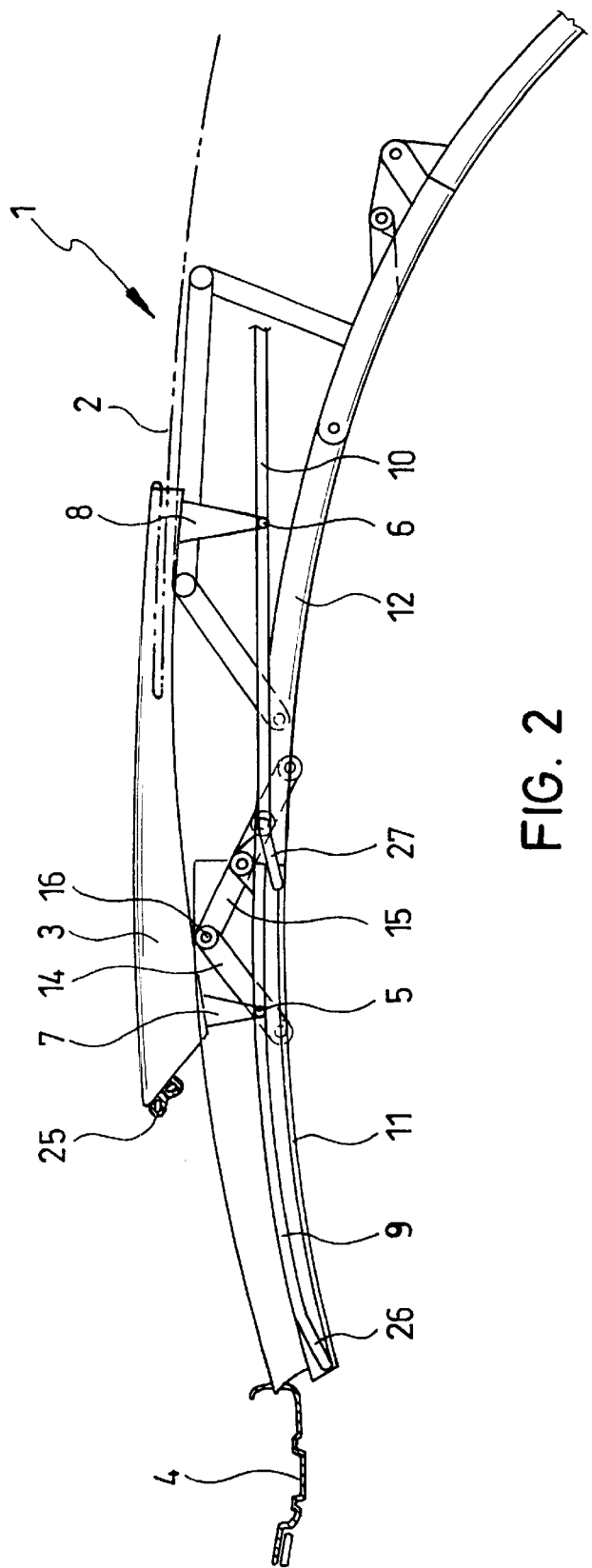

A folding top 1 of a convertible contains a textile canvas folding top 2 which is attached to a front bow 3 which forms the middle part of the tip of the folding top. The closed top 1 extends from a front cross member 4 on the top edge of the front window, or a scoop attached thereto, over the passenger compartment to the body in the rear area of the vehicle or convertible (see especially FIGS. 1 and 4) and is attached there in the conventional manner, for example, to the equator. The front bow 3 extends conventionally crosswise over the width of the top 1 and is supported to be able to move lengthwise in a guide on either side via one front and one rear sliding element 5 and 6 which are made or located on the front and rear supports 7 and 8 of the front bow 3. The guide has a front and a rear guide rail 9 and 10. Since the folding top 1 is formed essentially symmetrically to the lengthwise axis of the vehicle, the description is of the left side components of the folding top and top mechanism, but it also applies to the right-side components. The two guide rails 9 and 10 are attached on a front or a rear side member or roof rod 11 and 12 of the top mechanism or are integral with them.

Figure 5:
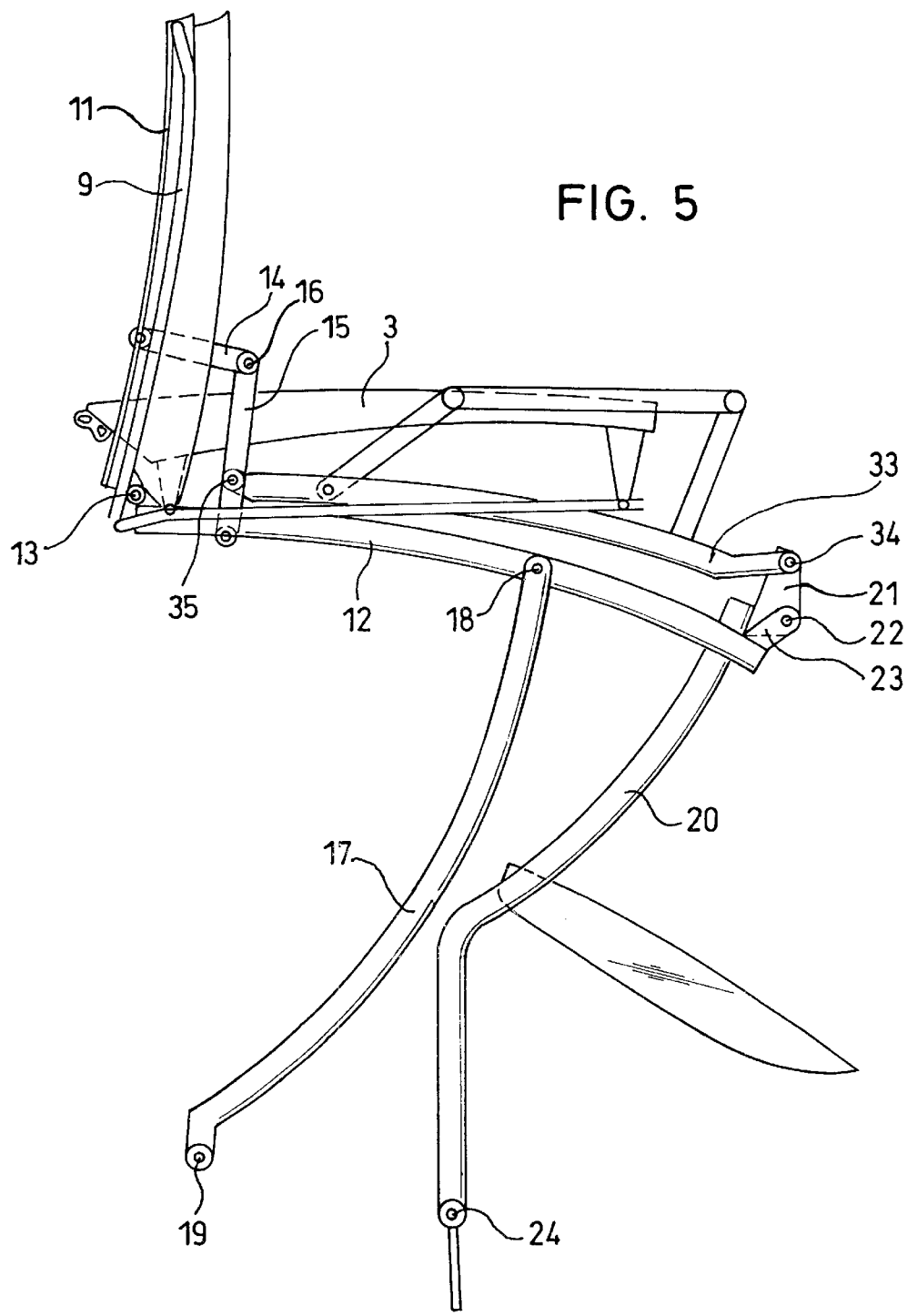

The front roof rod 11 is pivotally coupled to the rear roof rod 12 via a joint 13 (see, FIGS. 1 & 5). The front roof rod 11 is also coupled to the rear roof rod 12 via an auxiliary rod arrangement with a first pivoting lever 14 which is pivotally mounted on the front roof rod 11 and a second pivoting lever 15 which is pivotally mounted on the rear roof rod 12. The second pivoting lever 15 is hinged to the first pivoting lever 14 with a joint 16.

The rear roofrod 12 is movably supported via a parallelogram-like four-bar arrangement (see FIG. 5) which has a main column 17 which is coupled, on the one hand, at a joint 18 to the rear roof rod 12, and on the other hand, at a joint 19 to the vehicle body B which is only partially represented, and a main connecting rod 20, to the top end of which is attached a laterally offset bearing plate 21 which is pivotally joined at a pivot joint 22 on a side projection 23 of the rear roof rod 12, and which is coupled on its bottom end at a joint 24 to the vehicle body B.

Figure 3:
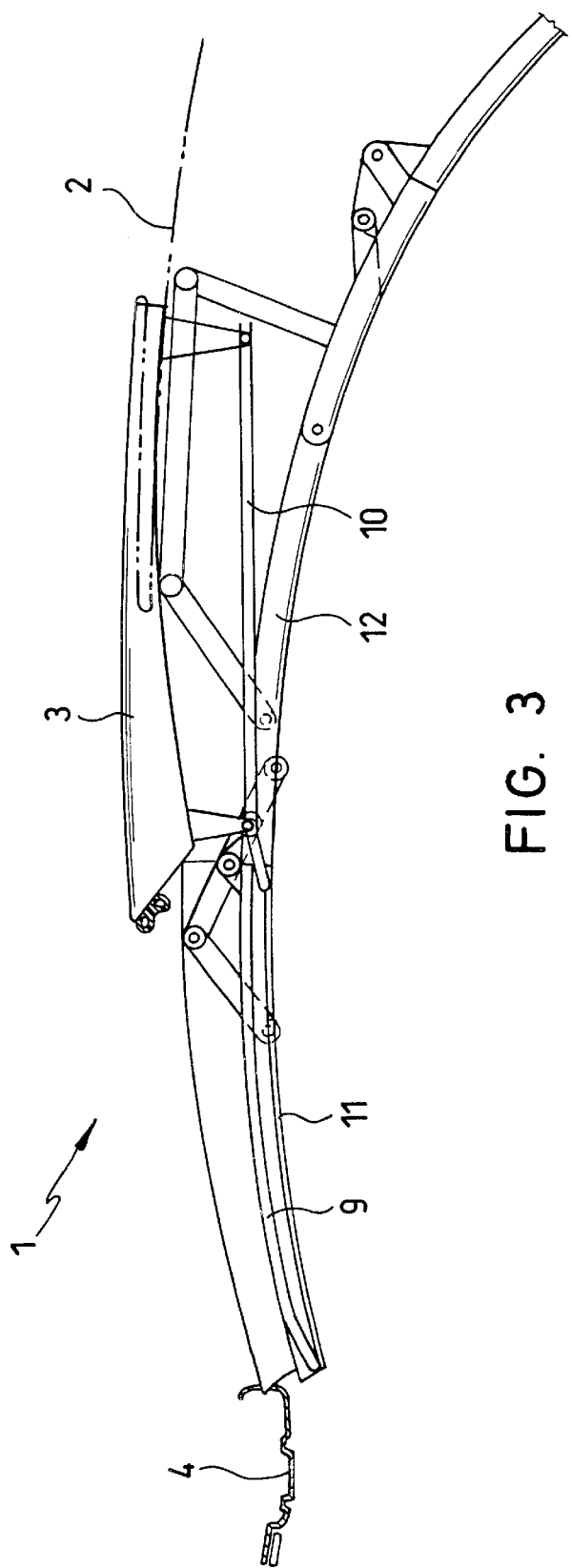
Figure 4:
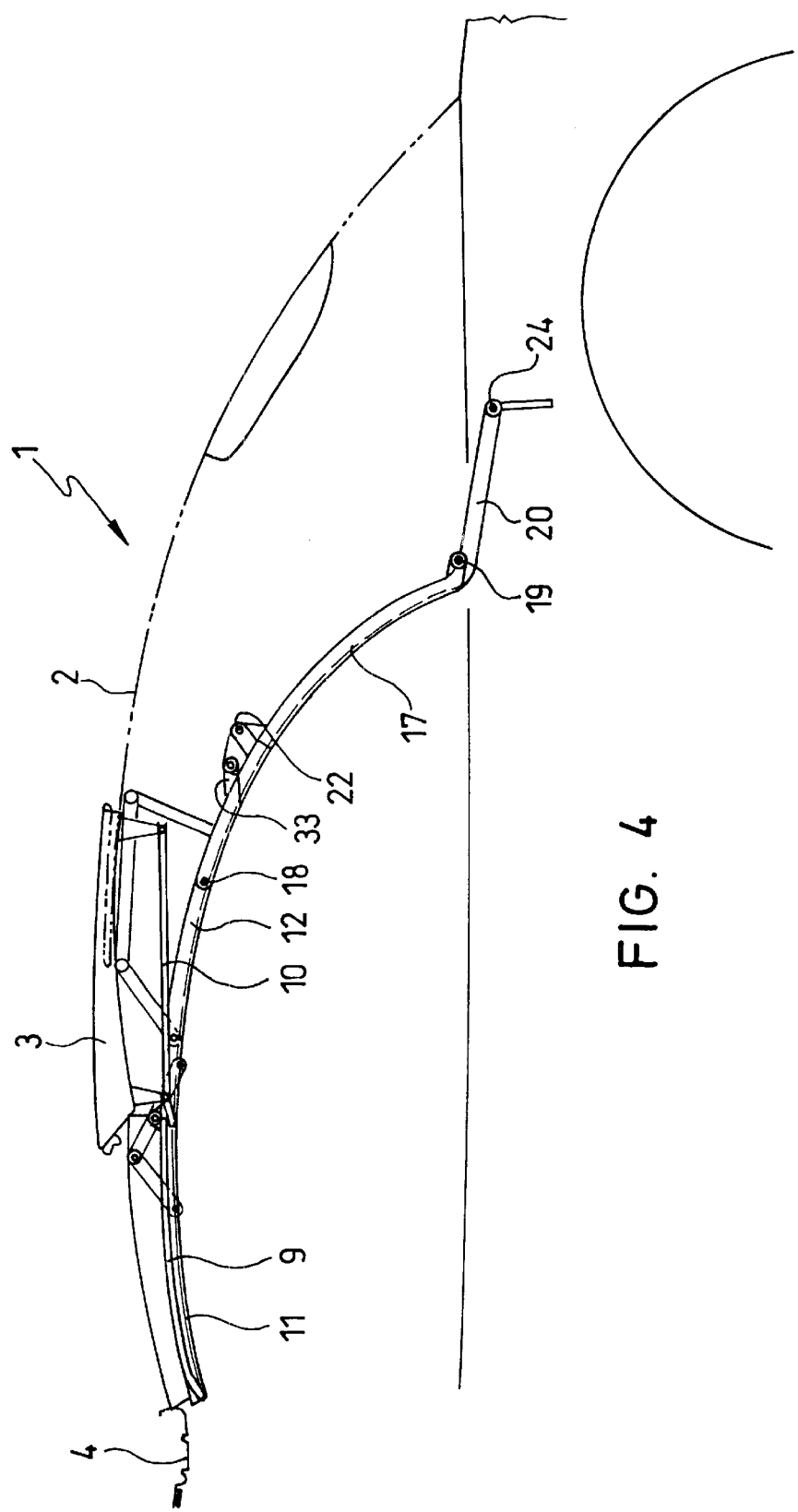

In the closed position as shown in FIG. 1, and in one of the partially open position or the intermediate position of the folding roof 1 as shown in FIG. 4, the front and the rear roof rod 11 and 12 are held by the main column 17 and the main connecting rod 20 of the four-bar arrangement on the contour of the top edge of the side window of the vehicle, a contour labeled as the K-line. The main column 17 and the main connecting rod 20 when viewed sideways as shown in FIGS. 1 to 4 lie on top of one another on the rear edge of the side window and thus form the continuation of the front and rear roof rods 11, 12 to a point located under the equator of the convertible (dot-dash line E). Seals for the side windows are attached to the roof rods 11, 12 and the main connecting rod 20.

In the closed position as shown in FIG. 1, the front roof rod 11 is supported on a cross member 4, on a wind deflector provided there, or the A column, and is locked to a lock means (not shown). The front bow 3 adjoins the cross member 4, a seal 25 on the front end of the front bow 3 sealing it against the cross member 4. The front guide rail 9 contains a front gradient section 26 for the front sliding element 4 and the rear guide rail 10 contains a front gradient section 27 for the rear sliding element 6.

When the folding roof 1 is opened into an intermediate position, the front bow 3 is pushed translationally to the rear by a drive (not shown) which is integrated, for example, on the rear roof rod 12 and is connected via bilateral gradient cables or Bowden cables to the front bow 3 for transmission of motion (motion from the FIG. 1 position to that shown in FIG. 2), being raised by the elements 5, 6 which slide initially in the gradient sections 26, 27 of the guide rails 9, 10, both on its front edge 28 and also on its rear edge 29. When the front bow 3 is moved back, first the relieved canvas top 2 arches behind the front bow 3 since here is it without a fixed connection to a bow of the top mechanism. In the closed position of the top 1, the canvas top 2 is held in shape either by the tension over the support part, for example, a bow, which is shown schematically by three holding elements 30, 31, 32 or it is attached to the bow. The front bow 3, which continues to move back and on which the canvas top 2 is attached, is pushed over the canvas top 2 which lies behind and which folds into a Z-shape, or accordian pleat (see folds F), in doing so (FIG. 2) as far as the intermediate position which is shown in FIG. 3, and in which the top 1 is partially opened in the manner of a sliding roof. Here, both the front and also the rear sliding element 5,6 of the front bow 3 are located in the rear guide rail 10 on the rear roof rod 12. However, also different intermediate positions of the front bow 3 as driving positions can be set, for example, the position shown in FIG. 2. By means of this translational displacement, the front bow 3, which conventionally has a raised curvature or arch which extends over the width of the top, lies over the next stationary or movable bow 31 which likewise has an arch in the identically cambered direction, i.e., the arches face in the same direction. A much smaller lowered height of the top 1 is achieved by this configuration.

To completely open the top 1, the four-bar rod arrangement of the top mechanism is moved by the drive in order to bring the top 1 into the rear lowered position, in which it is folded and lowered into a storage space. In this way, by means of a main drive (not shown) which engages, for example, the rear main connecting rod 20, this main connecting rod 20 is swung (see FIG. 5), by the forced guidance of the parallelogram-like four-bar rod arrangement, so that the rear roof rod 12 is pushed parallel to the rear or offset around the two hinge points 19 and 24 on the body in essentially a horizontal alignment.

Figure 6:
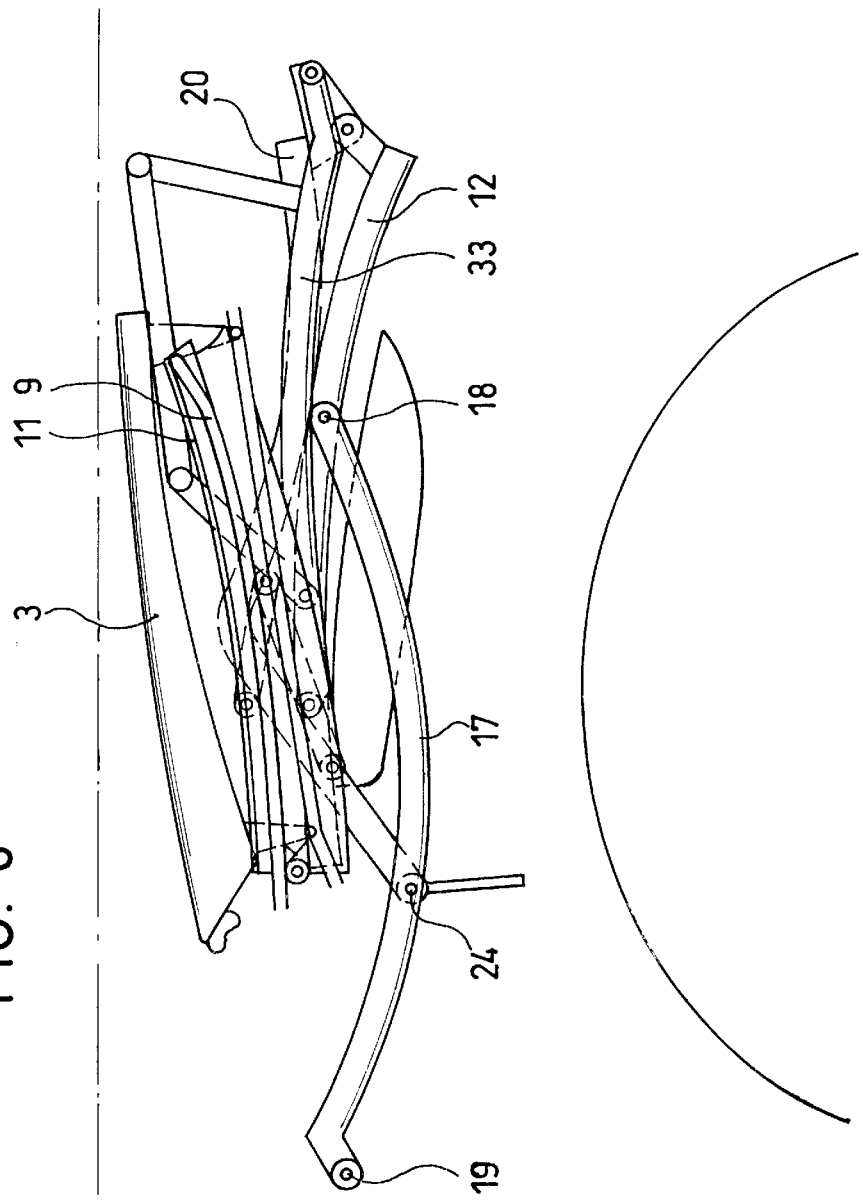

A connecting rod 33 (see, FIG. 5) is coupled on the rear end, via a joint 34, to the bearing plate 21 of the main connecting rod 20 and is hinged on the front end, by a joint 35, to the second pivot lever 15 of the rod arrangement, between the front and the rear roof rod 11, 12. In the above described pivoting of the four-bar arrangement, the connecting rod 33 is shifted to the rear relative to the rear roof rod 12 and pivots or folds the front roof rod 11, via the auxiliary rod arrangement 14, 15, 16, around its pivot bearing axis 13, which runs, for example, roughly perpendicular to the plane of the drawing, to the rear and laterally past the front bow 3 until, as shown in FIG. 6, it rests roughly on the rear roof rod 12. In this position, the top 1 is folded and lowered into the storage space, the front bow 3 and any other top bows lying with a uniform camber, and thus in a space-saving manner, on top of one another. Thus, the front bow 3 can be used as a cover of the storage space.

The top 1 is closed via the described intermediate positions in the opposite direction of motion.

Instead of the illustrated pivoting or swinging-in of the front roof rod 1 1 roughly around the transverse axis of the vehicle, it is also possible to pivot or swing-in the front roof rod 11 in other planes. The auxiliary rod arrangement 14, 15, 16 is then modified accordingly in order to drive the front roof rod 11 in the other pivot planes such as, for example, in a roughly horizontal plane, in this case the right and the left front roof rods 11 adjoin one another after swinging roughly in the transverse direction of the vehicle.

Figure 7:
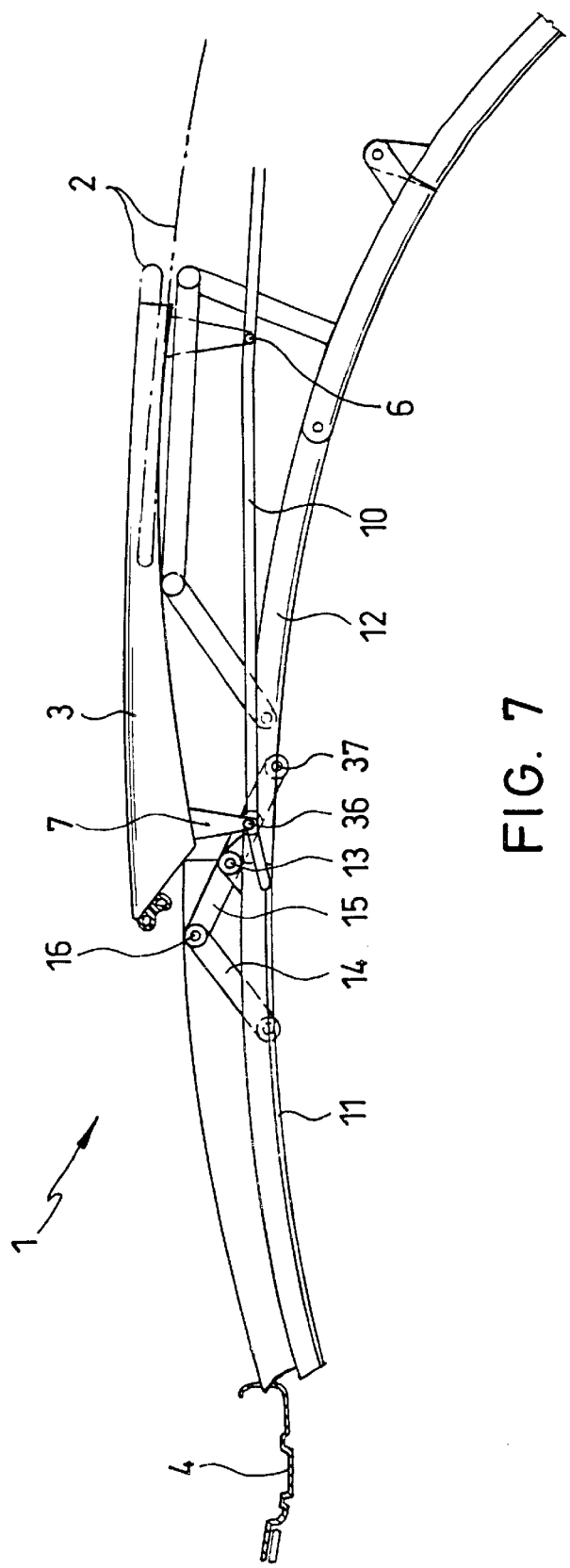
FIGS. 7 to 9 are side horizontal projections of another embodiment of a folding top in different positions from partially open to completely open.
Figure 8:
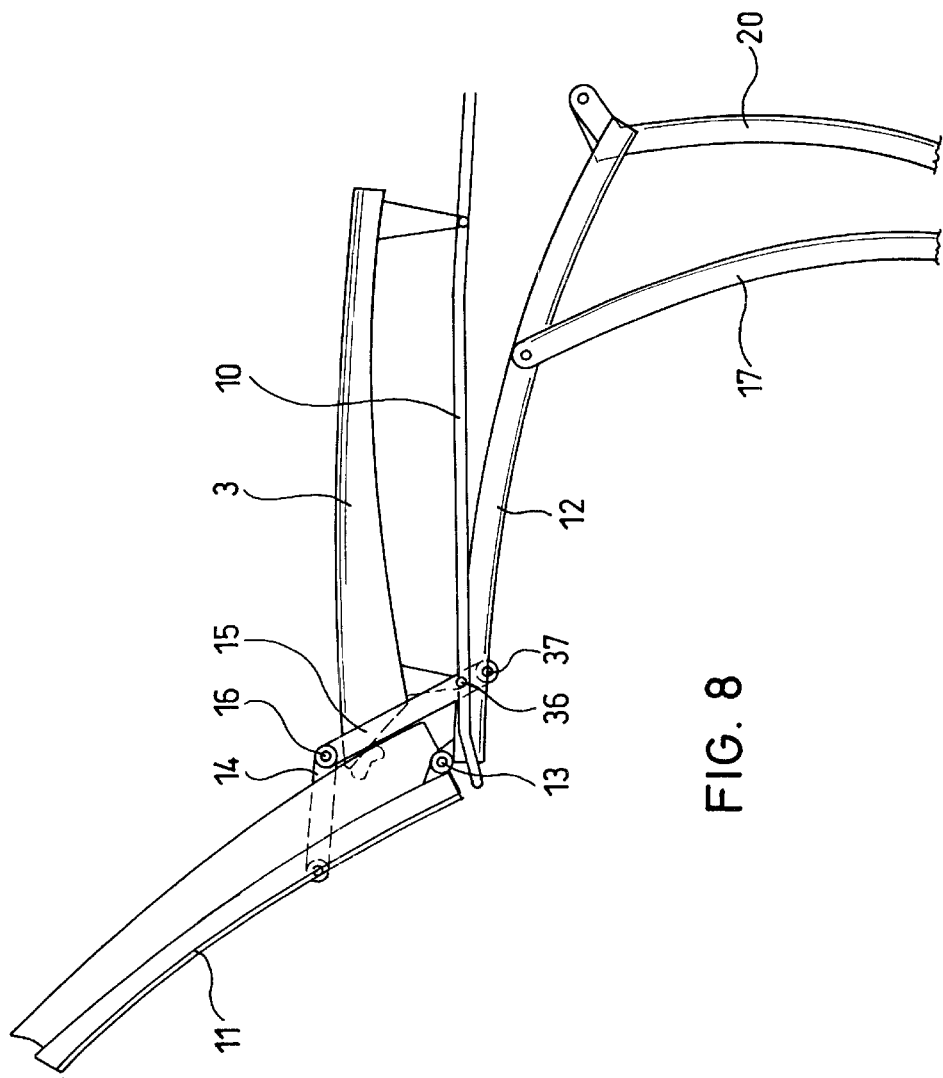
Figure 9:
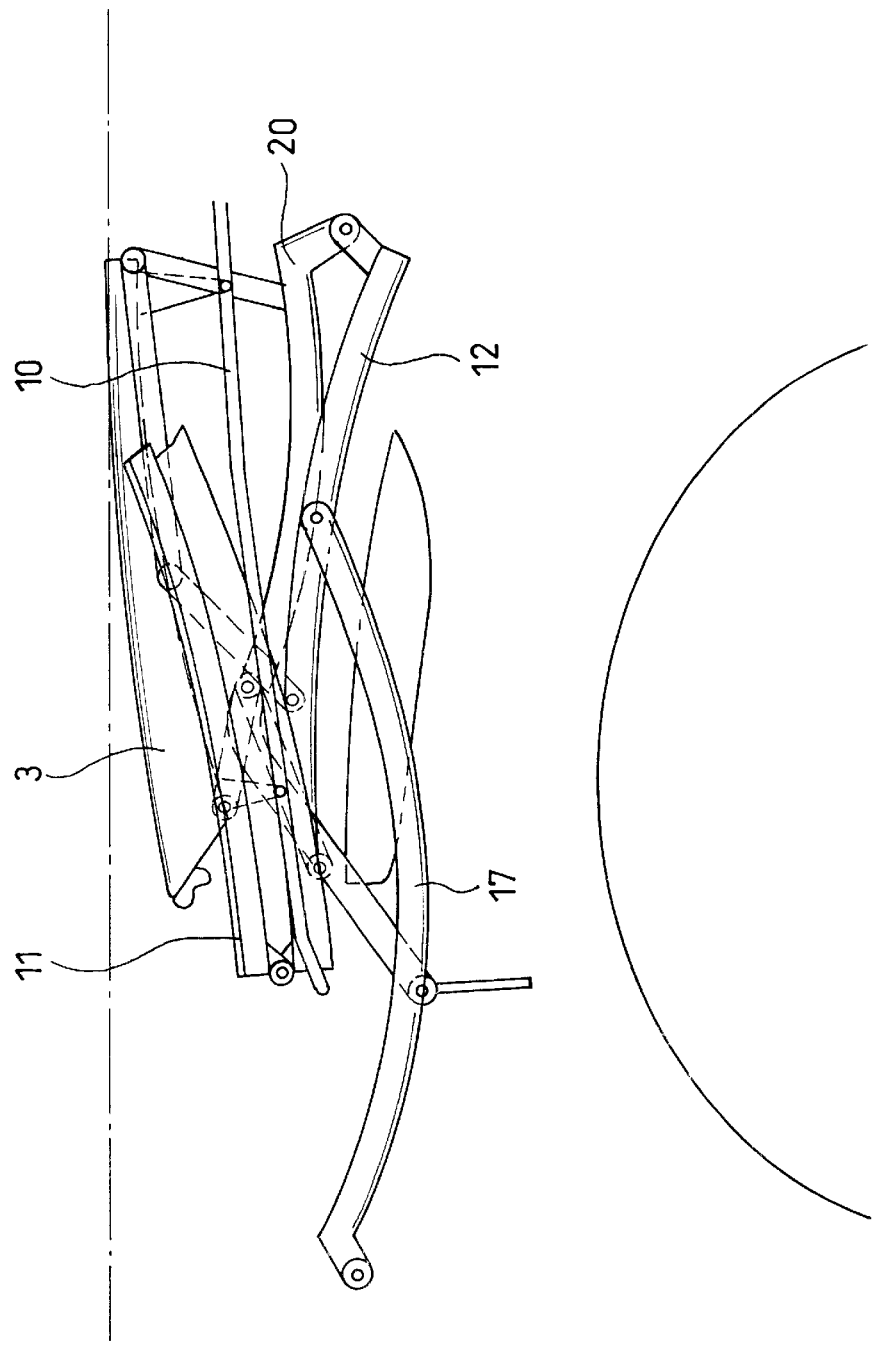
Figure 10:
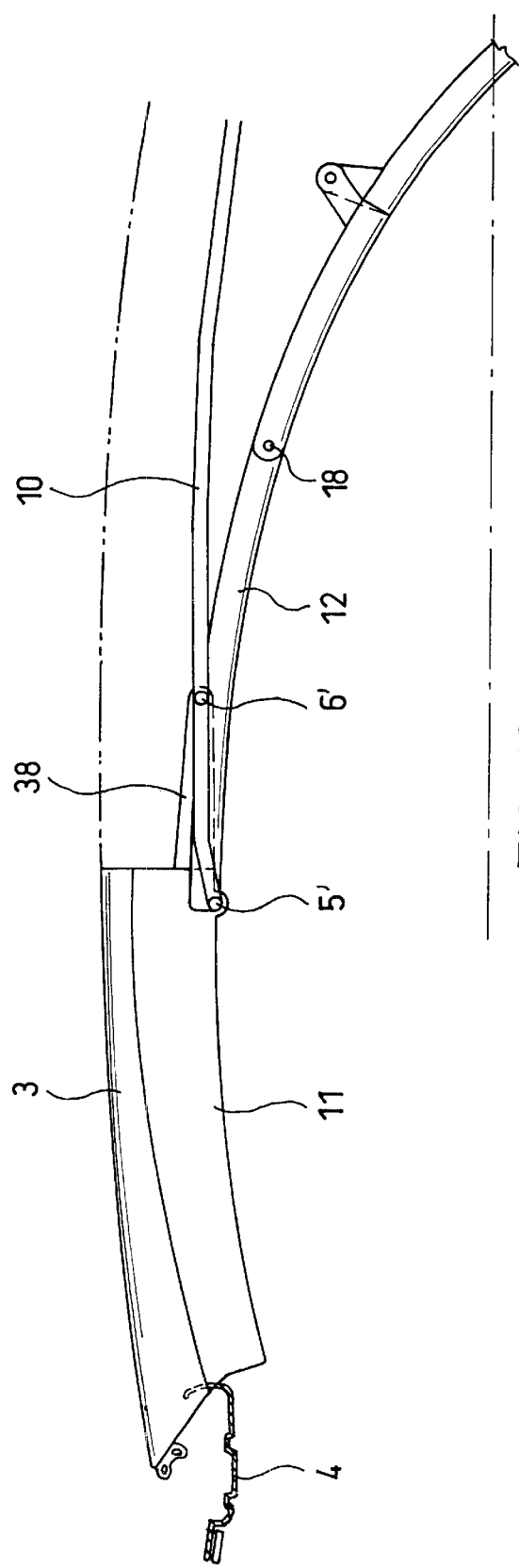
Figure 12:
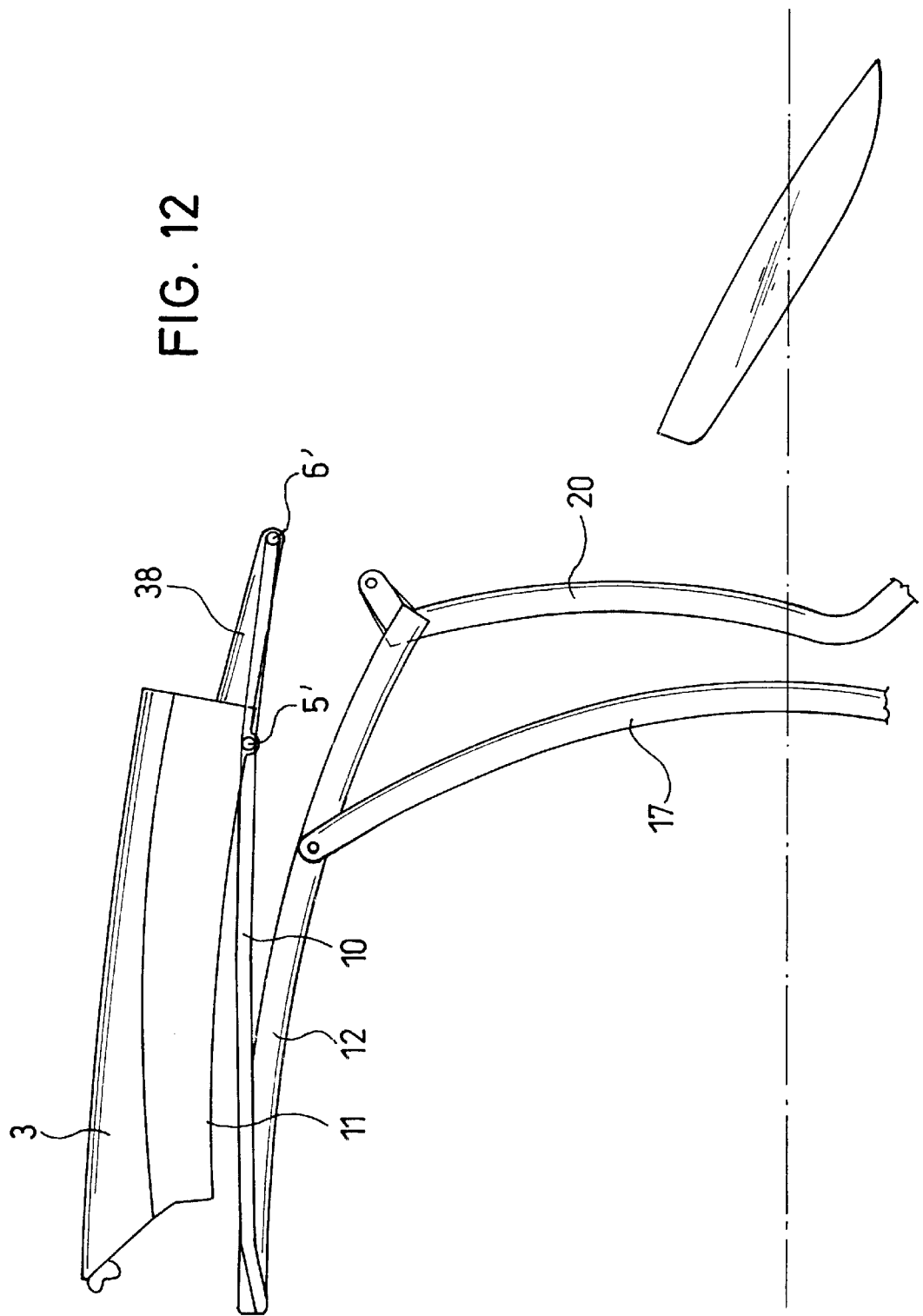
Figure 13:
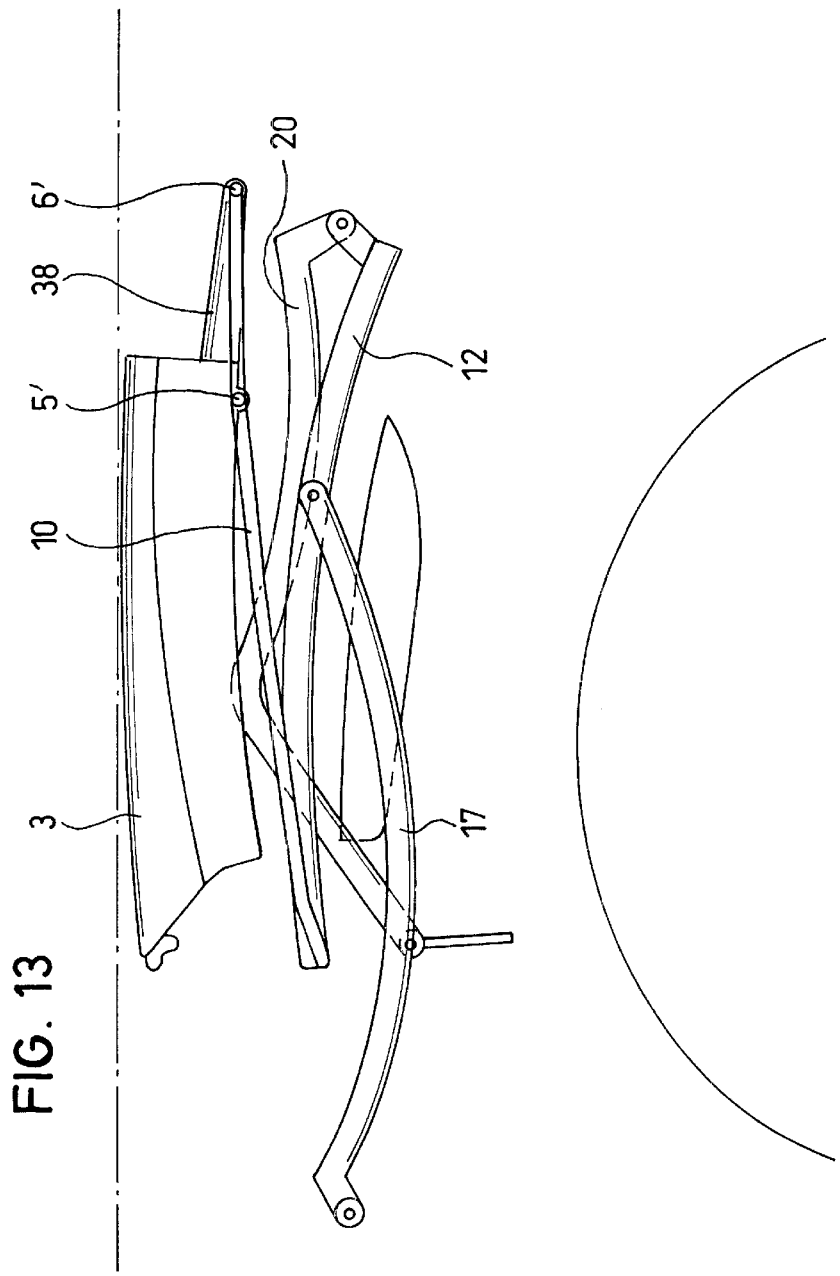

In one modified embodiment of the folding roof 1 (see FIG. 7 to 9), the pivoting of the front roof rod 11 is executed by the front bow 3 in a kinematic coupling by a journal 36 which is located on the front support 7 and which is located, for example, coaxial to the sliding element 5, when the front bow 3 is moved backwards, engaging the second pivot lever 15 of the auxiliary rod arrangement and swinging it around its coupling 37 to the rear roof rod 12; at the same time, via the first pivot lever 14, the front roofrod 11 is swung in the described manner in the joint 13. Thus, in this embodiment, a connecting lever 33 is unnecessary and the pivoting of the front roof rod 11 can be produced by the displacement motion of the front bow 3 independently of the lowering motion of the folding roof 1 which is transmitted by the four-bar mechanism.

In the embodiment of the top 1 which is shown in FIGS. 10 to 13, the front bow 3 contains as the front end of the top, the front roof rods 11 and a lock mechanism (not shown) for locking the front roof rod 11 on the top cross member 4 or the front window frame or the A-column.

The front bow 3, on each side, has a support part 38 which projects to the rear and which has a rear extension on which the two sliding element 5' and 6' are supported in spaced relationship in the lengthwise direction, both of the sliding elements 5', 6' being located in the guide 10 of the rear roof rod 12. When the front bow 3 is pushed translationally to the rear along the guide 10, the top 1 opens in the intermediate position as shown in FIG. 11, including the front side roof rod 11 which is integrated into the front bow 3. The canvas top 2, in turn, forms the already described Z-fold. With sufficient stability of the side frame parts of the top, i.e., of the rear roof rod 12 and the main column 17 and of the main connecting rod 20, this intermediate position can be attained during driving. By further swinging of the four-bar arrangement, the folding roof 1 is folded and lowered into the lowered position in the storage space (FIG. 13) via the position shown in FIG. 12. The folding roof 1 can be unfolded again by the opposite sequence of motions and closed over the passenger compartment.

Another embodiment of a pivot joint with which the front side member or roof rod 11 is pivotally supported on the rear roof rod 12 and a driven pivoting means which executes the pivoting of the front roof rod 11 are shown in FIGS. 14 to 18. Here, the rear right roof rod 12 forms a solid unit or roof cassette 41 with the main bow 40 and the opposite left roof rod 12' (see, FIG. 18), and is therefore, also called the side part 42 of the roof cassette. The side part 42 or 42' of the roof cassette represents the top connecting part of the four-bar arrangement and is held on the pivot bearing 18 by the main column 17 and on the pivot bearing 22 by the main connecting rod 20.

The side part 42 of the roof cassette, on its inside, contains a pivot bearing 43 (see FIG. 14) with a pivot axis 44, which dictates the pivot plane of the roof rod 11, and which is aligned especially vertically for pivoting support of a carrier 45 which is permanently connected to the front side member or the roof rod 11. In the side part 42 of the roof cassette, a horizontal elongated guide 46 is formed in which a sliding part 47 is movably held. The sliding part 47 has a projection 48 which projects laterally inward and to which an intermediate rod 49 is pivotally coupled. The intermediate rod 49 is pivotally mounted at its opposite end on the carrier 45 via a pivot joint 50 for rotation around a vertical pivot axis 51 which is parallel to and spaced from the pivot axis 44. With the roof rod arrangement folded out as shown in FIG. 14, a triangular arrangement is formed by the pivot axes 44, 51 and the coupling to the projection 48 so that rearward displacement of the sliding part 47 from the position shown in FIG. 14 swings the pivot joint 50, and thus the carrier 45 with the roofrod 11, inward around the axis 44 (see FIGS. 15–7).

The sliding part 47 is hinged via an intermediate rod 52 to the lever arm 53 of a ring 54. The ring 54 is pivotally mounted on the side part 42 of the roof cassette concentrically to the pivot bearing axis 18 of the main column 17 and can be coupled so as not to rotate relative to the main column 17, such that the main column 17 entrains the ring 54 over a certain pivot angle of its pivot swivel path relative to the side part 42 of the roof cassette, by which the roof rod 11 is swung via the described elements.

Figure 14:
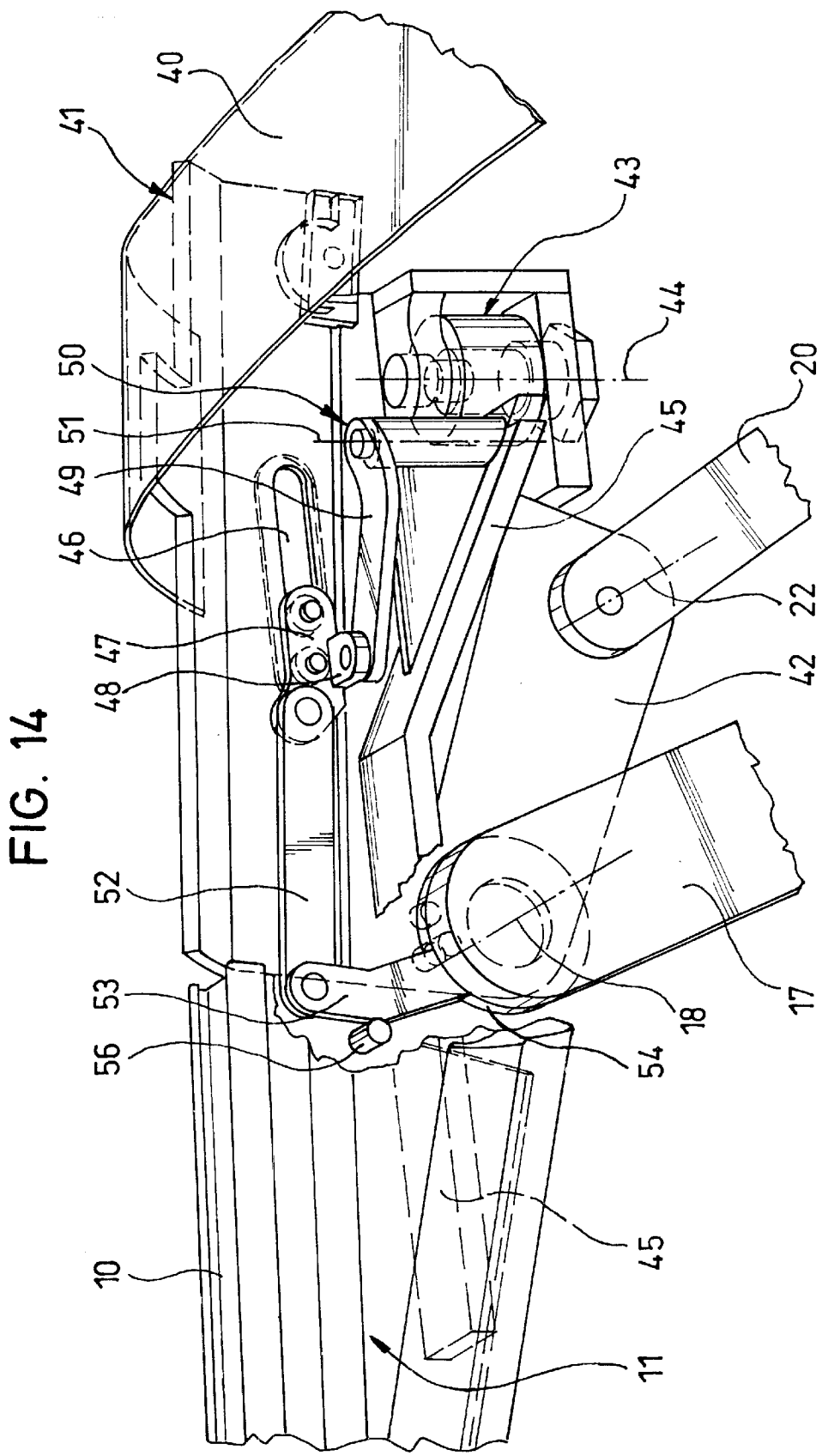
FIGS. 14 to 18 are perspective views of a hinge arrangement with a pivot drive for a side roof rod which can be pivoted into different positions.
Figure 15:
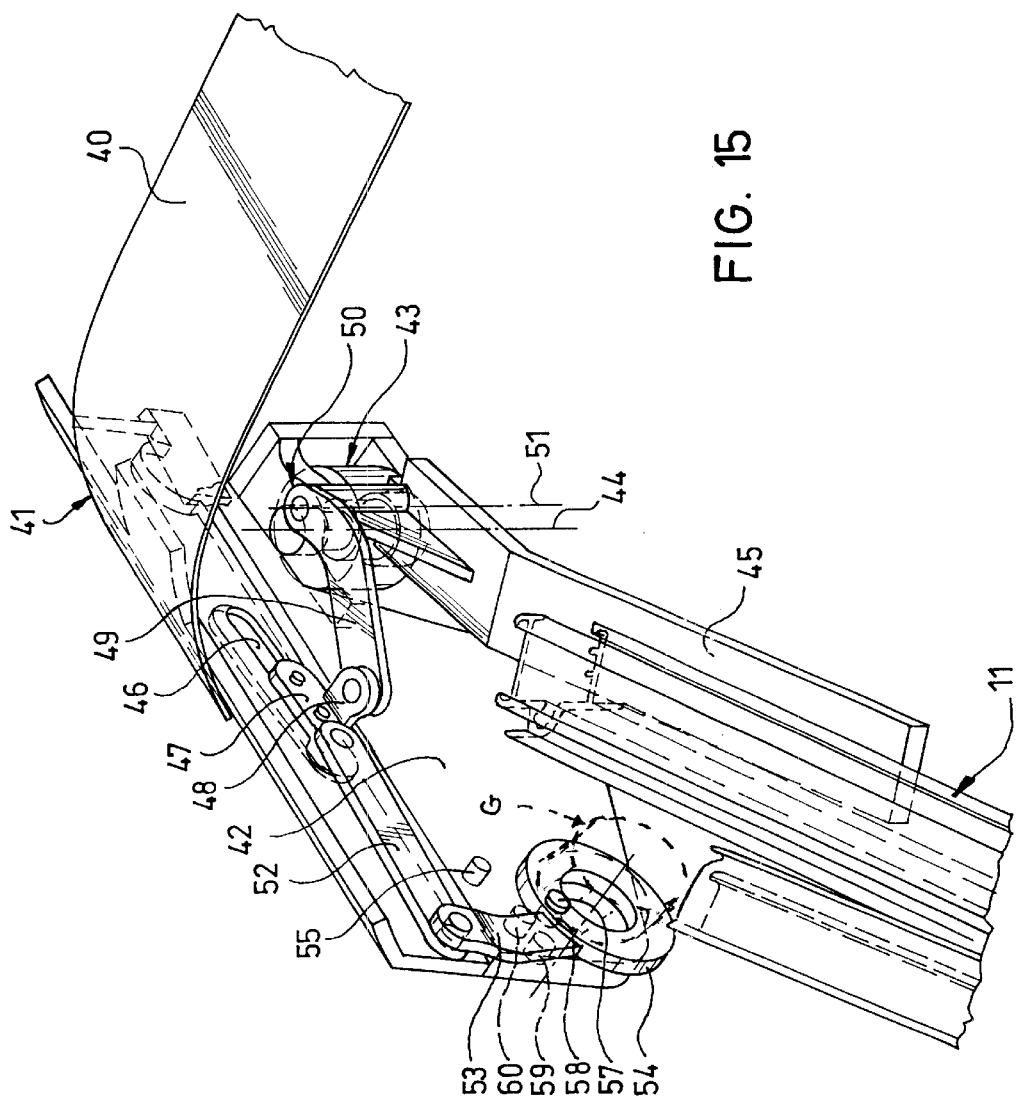
Figure 16:
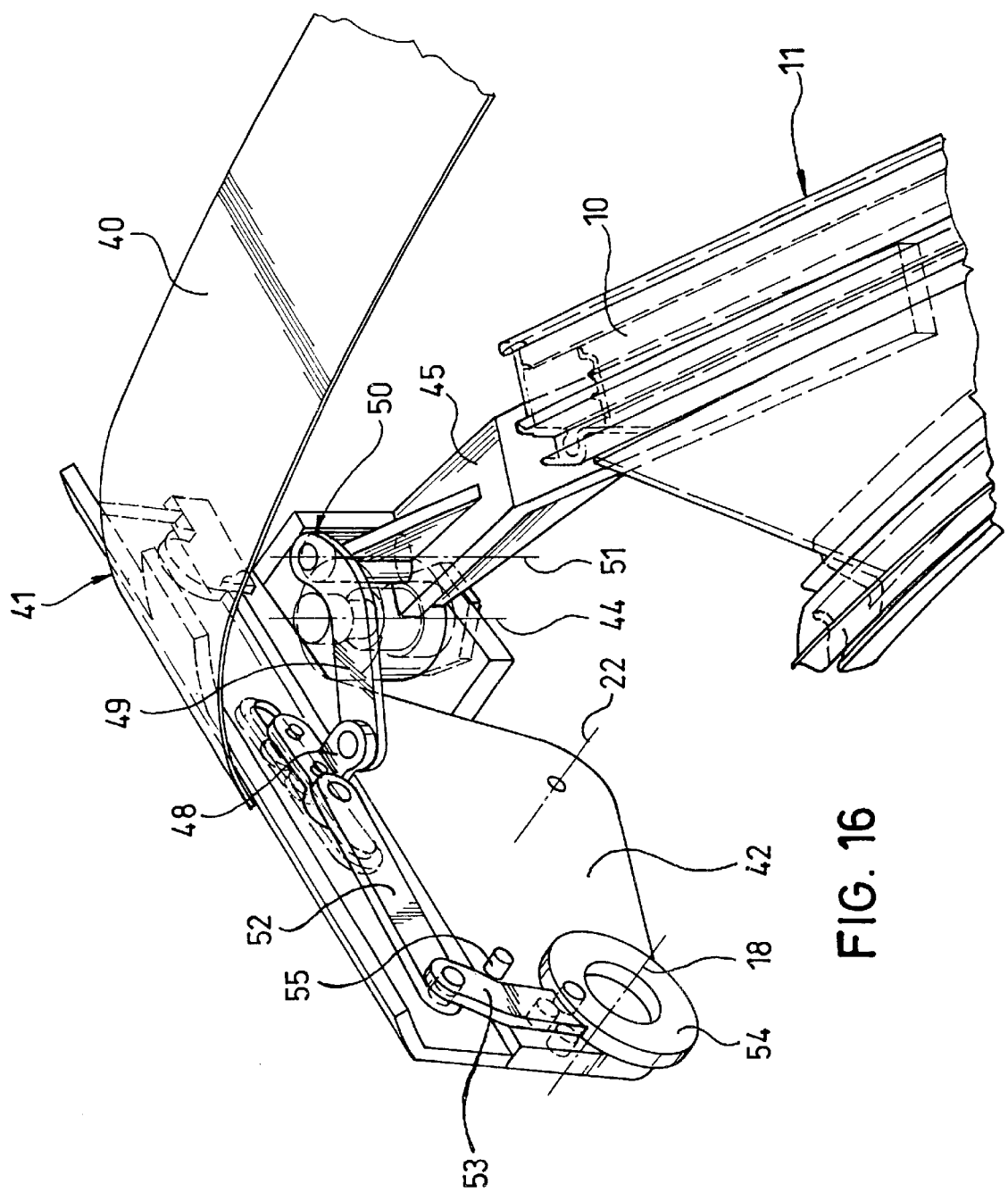
Figure 17:
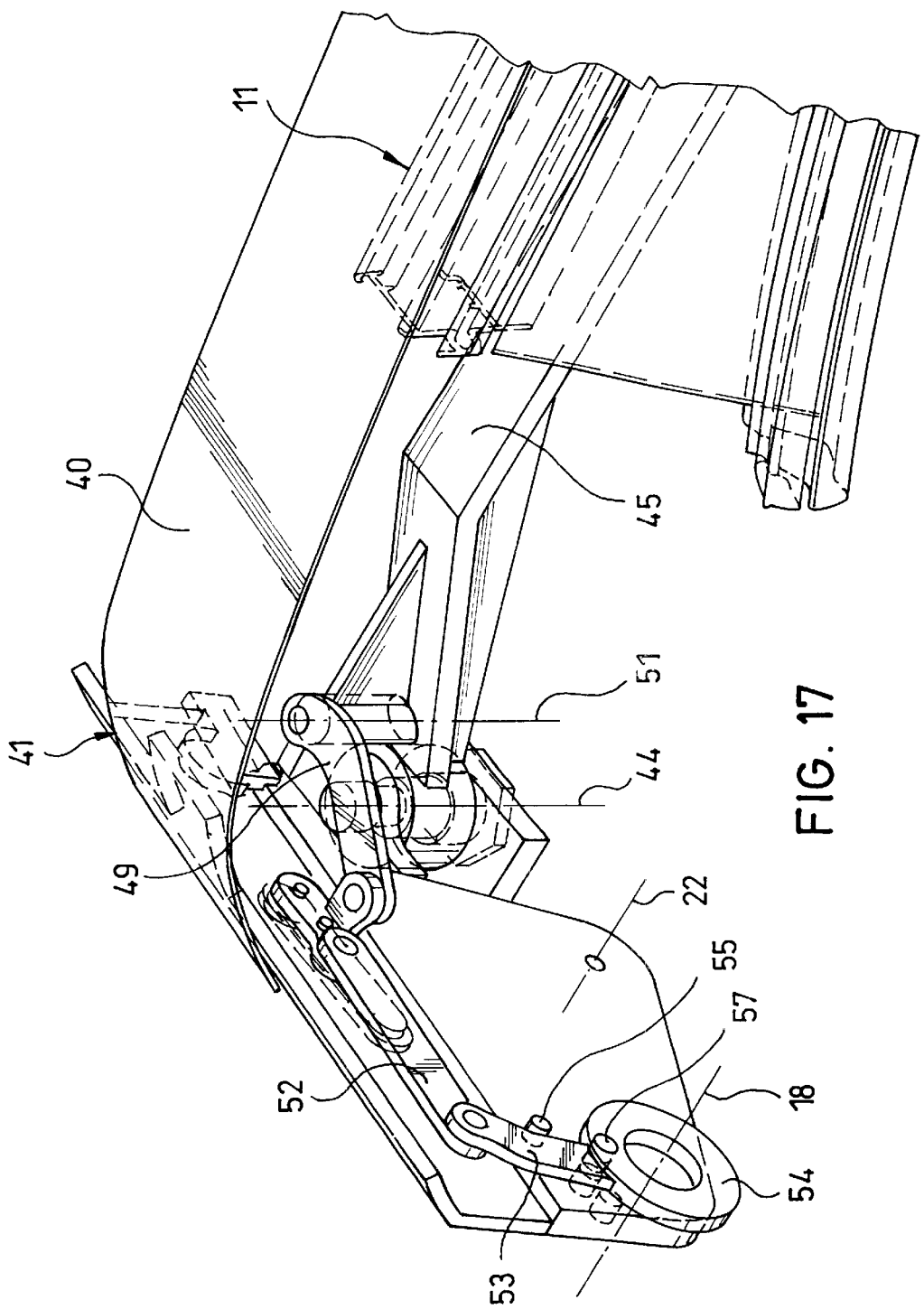
Figure 18:
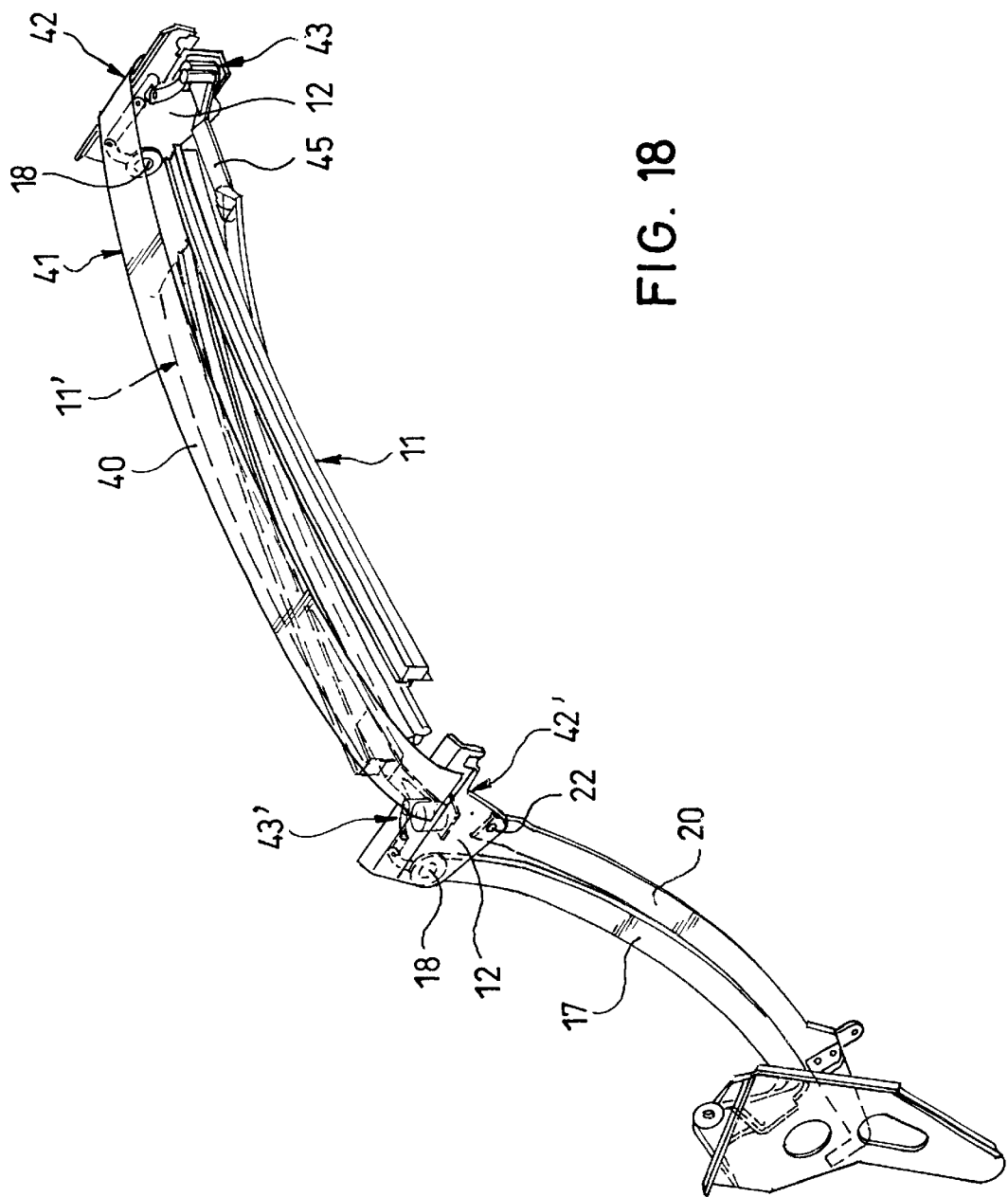

The pivot path of the ring 54, and thus the pivot angle of the roof rod 11, are limited in a defined manner by a stop 55 on the side part 42 of the roof cassette (see FIG. 17) and a stop 56 on the pivoting roof rod 11 (see, FIG. 14). The stops 55, 56 can be pin-like projections or the like.

A lock means for coupling of the ring 54 to the main column 17 without relative rotation over a certain pivot area of the main column relative to the side part 42 of the roof cassette contains a lock pin 57 (see, FIG. 15) which is supported in a hole 58 of the ring 54 and is pressed by a spring element against the side of the main column 17 which adjoins the ring 54. In the main column 17, a recess is formed into which the lock pin 57 is partially pressed when it is located congruently to the lock pin 57 when the main column is pivoted so that relative rotation resistant coupling is formed between the main column 17 and the ring 54. After the provided common pivot path, the lock pin 57 is pressed out of the recess of the main column 17, and in doing so fits, partially into one of two holes 59 and 60, which are located opposite one another in the side part 42 of the roof cassette.

Thus, the rotary coupling is again cancelled and the main column 17 can be swung further in the two pivot directions without forced coupling to the roof rod 11. The two holes 59 and 60 are positioned such that they are assigned to the two swivel end positions of the ring 54 over the lock pin 57.

On the opposite left side part 42' of the roof cassette (see, FIG. 18), the pivot joint 43' is offset to the front in the lengthwise direction of the folding roof or vehicle relative to the pivot joint 43 of the right side part 42 of the roof cassette so that the left roof rod 11' which has been swung-in lies in a transverse alignment roughly parallel in front of the right, swung-in roof rod 11.

Feasibly, the connector, which is comprised of the parts 47, 48, 49, 52, 53 & 54, provides a varying drive speed for the front roof rod 11. Thus, for example, the transmission of the motion of the connector 47, 48, 49, 52, 53, & 54 can be designed such that the pivoting speed of the roof rod 11 is adjusted depending on the pivoting speed of the main column 17 and is variable over the pivoting path. Therefore, at the start and at the end of pivoting, a comparatively slow speed for lowering of the roof rods on the roof cassette 41 and for coupling to the front cross member and in between a higher pivoting speed can be set.

Preferably, the connector 47, 48, 49, 52, 53, & 54 can contain a transmission gearing G (shown diagrammatically in phantom outline only in FIG. 15) so that it is possible to match the input drive motion to the output drive motion. If, in doing so, the transmission gearing G converts the input drive motion into a varying output drive motion of the front roof rod 11. Almost any necessary pivot drive motions for the roof rods can be carried out.

FIGS. 19 and 20 show the top mechanism with the bilateral front side members or roof rods 11 which, with a joint and pivot arrangement which is modified compared to the above described embodiment, is pivoted to the outside by a certain angle a in the lowered position when the roof cassette 41 is pivoted rearward, so that the roof rods 11, when lowered into the storage space next to the main column 17 and the main connecting rod 20, can be accommodated in a side lining. The angle β is dependent on the specific arrangement and is, for example, approximately 80° to 10°.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. A pivoting drive for a front side roof rod of a motor vehicle roof having a rear side roof rod that is pivotally supported by a rod arrangement on the body of the motor vehicle, said rod arrangement having a rod and said roof being capable of being lowered into a lowered position, said drive comprising:

a connector that drivingly engages said front side roof rod to said rod of said rod arrangement such that said front side roof rod pivots relative to said rear side roof rod in a plane extending crosswise relative to a direction of lowering movement of the side rods and rod arrangement when said rod of said rod arrangement pivots to lower said roof said lowered position.

2. The drive of claim 1, wherein said connector pivots said front roof rod horizontally.

3. The drive of claim 1, wherein said rod arrangement is a parallelogram-like four-bar arrangement that includes a main connector.

4. The drive of claim 1, wherein said connector is adapted to vary the pivoting speed of said front side roof rod.

5. A pivoting drive for a front side roof rod of a motor vehicle roof having a rear side roof rod that is pivotally supported by a rod arrangement on the body of the motor vehicle, said rod arrangement having a rod and said roof being capable of being lowered into a lowered position, said drive comprising:

a connector that drivingly engages said front side roof rod to said rod of said rod arrangement such that said front side roof rod pivots relative to said rear side roof rod when said rod of said rod arrangement pivots when said roof is lowered into said lowered position, further comprising a lock that couples said connector to said rod of said rod arrangement over a defined pivot path of said rod of said rod arrangement.

6. A pivoting drive for a front side roof rod of a motor vehicle roof having a rear side roof rod that is pivotally supported by a rod arrangement on the body of the motor vehicle, said rod arrangement having a rod and said roof being capable of being lowered into a lowered position, said drive comprising:

a connector that drivingly engages said front side roof rod to said rod of said rod arrangement such that said front side roof rod pivots relative to said rear side roof rod when said rod of said rod arrangement pivots when said roof is lowered into said lowered position; wherein said connector includes a transmission element that includes:

a ring that is pivotally mounted to said connector and about a pivot axis of said rod of said rod arrangement with said connector; and a lever arm drivingly connecting said ring to said front side roof rod via an intermediate rod of said connector.

7. The drive of claim 6, further comprising a lock pin that is axially moveably supported in said ring, wherein said connector includes a roof cassette side part and wherein said lock pin is adapted to couplingly engage said rod of said rod arrangement based upon the pivot position of said rod of said rod arrangement relative to said roof cassette side part.

8. The drive of claim 6, further comprising at least one stop that limits the path of said connector.

9. The drive of claim 8, wherein said at least one stop limits the path of said lever arm.

10. The drive of claim 1, wherein said connector includes transmission gearing.

11. The drive of claim 10, wherein said transmission gearing converts the input drive motion into a varying output drive motion of said front side roof rod.

* * * * *